United States Patent
Bayter et al.

(10) Patent No.: US 12,482,178 B2
(45) Date of Patent: Nov. 25, 2025

(54) METHOD OF GENERATING FRAMES FOR A DISPLAY DEVICE

(71) Applicant: Ormuco Inc., Montreal (CA)

(72) Inventors: Orlando Bayter, Montreal (CA); Bruca Lock, Montreal (CA)

(73) Assignee: Ormuco Inc., Montreal (CA)

( * ) Notice: Subject to any disclaimer, the term of this patent is extended or adjusted under 35 U.S.C. 154(b) by 148 days.

(21) Appl. No.: 18/416,175

(22) Filed: Jan. 18, 2024

(65) Prior Publication Data
US 2024/0242429 A1    Jul. 18, 2024

Related U.S. Application Data

(60) Provisional application No. 63/439,855, filed on Jan. 18, 2023.

(51) Int. Cl.
*G06T 17/00* (2006.01)
*G06T 1/20* (2006.01)

(52) U.S. Cl.
CPC .......... *G06T 17/00* (2013.01); *G06T 1/20* (2013.01); *G06T 2200/08* (2013.01)

(58) Field of Classification Search
CPC ....... G06T 17/00; G06T 1/20; G06T 2200/08; G06T 15/005
See application file for complete search history.

(56) References Cited

U.S. PATENT DOCUMENTS

| | | | |
|---|---|---|---|
| 2012/0154389 A1* | 6/2012 | Bohan | G06F 9/5072 345/419 |
| 2018/0047130 A1* | 2/2018 | Yang | G06T 15/20 |

FOREIGN PATENT DOCUMENTS

CN    115439586 A    * 12/2022    ............ A63F 13/52

OTHER PUBLICATIONS

Shi et al., Scalable Support for 3D Graphics Applications in Cloud, 2010 IEEE 3rd International Conference on Cloud Computing, pp. 349-353. (Year: 2010).*
Wikipedia, "Client-server model", Wikipedia, accessed online at <https://en.wikipedia.org/wiki/Client-server_model> on Nov. 20, 2024.

* cited by examiner

*Primary Examiner* — Haixia Du
(74) *Attorney, Agent, or Firm* — Nexus Law Group LLP; Nicholas Toth; Otto Zsigmond

(57) ABSTRACT

Disclosed is a computer-implemented method of generating frames, via a plurality of network-connected servers, for a display device operably connected to a first server. A frame generation trigger is generated in response to a user input to the first server. Application data is transmitted, via the network, to the plurality of servers in response to the frame generation trigger. A plurality of graphics-rendering pipelines are generated in response to the application data on corresponding servers so as to correspondingly generate a plurality of encoded data chunks. This plurality of encoded data chunks are received at the first server, via the network, and then transmitted to the display device via the first server. The display device refreshes based on the plurality of encoded data chunks to generate the one or more frames. A system, and non-transitory computer-readable medium for implementing the method are also disclosed.

9 Claims, 8 Drawing Sheets

METHOD OF GENERATING FRAMES FOR A DISPLAY DEVICE

CROSS-REFERENCE TO RELATED APPLICATIONS

This application claims the benefit of U.S. Provisional Application No. 63/439,855, filed on Jan. 18, 2023, which application is incorporated by reference herein in its entirety, and is hereby expressly made a part of this specification.

TECHNICAL FIELD

This invention relates to graphics rendering on display devices and, in particular, to a method of generating frames for a display device.

BACKGROUND

Conventionally, a given instance of an operating system is installed in and executed on a given computing server or other computing device. That is, one instance of an entire operating system is executed on each device within a network of devices.

When graphical objects are conventionally streamed via a network connection from a computing server to a client device for display on the client device, the one central processing unit (CPU) of the computing server renders, encodes and initiates sequential streaming of digital frames representing the graphical objects.

It is desired to take advantage of the distributed nature of a network of computing devices for improving user's experiences interacting with an application that requires a significant amount of computational resources, e.g. virtual reality of 3D modelling.

SUMMARY

The above shortcomings may be addressed by providing, in accordance with one aspect of the invention, a system for distributed computing operations.

In an aspect, there is disclosed a computer-implemented method of generating one or more frames, via a plurality of servers connected to each other by a network, for a display device operably connected to a first server of the plurality of servers. The method includes (a) generating a frame generation trigger in response to a user input to the first server. The method includes (b) transmitting, via the network and in response to the frame generation trigger, application data to the plurality of servers. The method includes (c) causing generation of a plurality of graphics-rendering pipelines for the display device in response to the application data, each of the plurality of graphics-rendering pipelines being generated on a corresponding server of the plurality of servers and being configured to generate a corresponding encoded data chunk of a plurality of encoded data chunks. The method includes (d) receiving at the first server from the plurality of servers, via the network, the plurality of encoded data chunks. The method includes (e) transmitting the plurality of encoded data chunks to the display device via the first server, the display device configured to refresh based on the plurality of encoded data chunks to generate the one or more frames.

In some embodiments of the method, the application data includes 3D model data for generating a scene. In some embodiments of the method, step (a) includes generating the frame generation trigger by a containerized application associated with an operating system of the first server.

In an aspect, there is disclosed a non-transitory computer-readable medium having stored thereon machine interpretable instructions which, when executed by one or more processors, cause the one or more processors to perform a computer-implemented method of generating one or more frames, via a plurality of servers connected to each other by a network, for a display device operably connected to a first server of the plurality of servers This computer-implemented method includes (a) generating a frame generation trigger in response to a user input to the first server. The method includes (b) transmitting, via the network and in response to the frame generation trigger, application data to the plurality of servers. The method includes (c) causing generation of a plurality of graphics-rendering pipelines for the display device in response to the application data, each of the plurality of graphics-rendering pipelines being generated on a corresponding server of the plurality of servers and being configured to generate a corresponding encoded data chunk of a plurality of encoded data chunks. The method includes (d) receiving at the first server from the plurality of servers, via the network, the plurality of encoded data chunks. The method includes (e) transmitting the plurality of encoded data chunks to the display device via the first server, the display device configured to refresh based on the plurality of encoded data chunks to generate the one or more frames.

In an aspect, there is disclosed a system for generating one or more frames. The system includes a display device. The system includes a first server of a plurality of servers connected to each other by a network, the first server being operably connected to the display device and being configured to generate the one or more frames via the plurality of servers for the display device. The first server includes one or more processors, and computer-readable memory coupled to the one or more processors and storing processor-executable instructions that, when executed, configure the one or more processors to: (a) generate a frame generation trigger in response to a user input to the first server; (b) transmit, via the network and in response to the frame generation trigger, application data to the plurality of servers; (b) cause generation of a plurality of graphics-rendering pipelines for the display device in response to the application data, each of the plurality of graphics-rendering pipelines being generated on a corresponding separate server of the plurality of servers and configured to generate a corresponding separate encoded data chunk of a plurality of encoded data chunks; (c) receive at the first server from the plurality of servers, via the network, the plurality of encoded data chunks; and (d) transmit the plurality of encoded data chunks to the display device, via the first server, the display device configured to refresh based on the plurality of encoded data chunks to generate the one or more frames.

In accordance with one aspect of the invention, a system for distributed computing operations disclosed. In some embodiments, the system includes a plurality of networked computing servers, a kernel of an operating system being installed in each said server, one or more remaining portions of the operating system being installed in a first one or more said servers, one or more portions of libraries respectively associated with the operating system being installed in a second one or more said servers, one or more portions of computing applications being installed in a third one or more said servers, wherein the system is operable to restrict execution associated with one said computing application on one said server to a specifiable said one or more portions of said one computing application such that said execution associated with said one computing application is distributed across a plurality of said servers.

The computing applications may include multi-process applications. The computing applications may include single-process applications. The system may be operable to adjust the number of said servers employed in executing said one computing application. The system may be operable to dynamically adjust the number of said servers employed in executing said one computing application. The system may be operable to dynamically adjust in real time the number of said servers employed in executing said one computing application.

The one or more portions of the computing applications may include a controller for controlling a peripheral device. The peripheral device may be a VR (Virtual Reality) headset. The peripheral device may be a user-input device. The user-input device may be a joystick. The one or more portions of the computing applications may include an audio module. The one or more portions of the computing applications may include a microphone interface module. The one or more portions of the computing applications may include a camera module. The one or more portions of the computing applications may include a snipping tool. The one or more portions of the computing applications may include an application bucket. The one or more portions of the computing applications may include a shared session module. The one or more portions of the computing applications may include an application store module. The one or more portions of the computing applications may include a split-screen module. The one or more portions of the computing applications may include a docking module. The one or more portions of the computing applications may include a shared drive module.

The one or more remaining portions of the operating system may include an application manager module. The one or more remaining portions of the operating system may include a notification module. The notifications may provide unified notifications from disparate servers. The one or more remaining portions of the operating system may include a session manager module. The one or more remaining portions of the operating system may include a resource manager module. The one or more remaining portions of the operating system may include a package manager module. The one or more remaining portions of the operating system may include an interactive display module. The one or more remaining portions of the operating system may include a network module. The one or more remaining portions of the operating system may include a network connection module. The one or more remaining portions of the operating system may include a network interface module. The one or more remaining portions of the operating system may include a graphics module. The one or more remaining portions of the operating system may include a graphics driver module. The one or more remaining portions of the operating system may include a device module. The one or more remaining portions of the operating system may include a peripheral device module. The one or more remaining portions of the operating system may include a network-connected device module. The one or more remaining portions of the operating system may include a media module. The one or more remaining portions of the operating system may include a multi-media module. The one or more remaining portions of the operating system may include a VR module. The one or more remaining portions of the operating system may include a syncer module. The one or more remaining portions of the operating system may include a synchronization module. The one or more remaining portions of the operating system may include a network-wide synchronization module.

The system may be operable to associate a unique identifier with each said kernel. The system may be operable to associate a unique identifier with each said one or more remaining portions of the operating system. The system may include a plurality of said kernels associated with a plurality of said operating systems, respectively. The system may include said plurality of kernels installed in said plurality of servers, respectively. The system may include said plurality of kernels installed in each said server. The system may be operable to associate a unique identifier with each said operating system.

The plurality of networked computing servers may include a plurality of servers in networked communication with each other.

In accordance with another aspect of the invention, there is provided a method of streaming digitized data. The method involves: (a) transferring a first digitized object of the digitized data associated with a computing application being executed across a plurality of servers from a first server of the plurality of servers to a second server of the plurality of servers when the second server is executing a first rendering pipeline; and (b) transferring a second digitized object of the digitized data associated with the computing application from the first server to a third server of the plurality of servers when the third server is executing a second rendering pipeline.

The method may involve generating a first data fragment by the first rendering pipeline. The method may involve generating a second data fragment by the second rendering pipeline. Generating a first data fragment by the first rendering pipeline may involve generating a plurality of said first data fragments. Generating a second data fragment by the second rendering pipeline may involve generating a plurality of said second data fragments.

The method may involve generating at least one of an encoded block and a sparse block in response to the first data fragment. The method may involve generating at least one of an encoded block and a sparse block in response to the plurality of said first data fragments. The method may involve generating at least one of an encoded block and a sparse block in response to the second data fragment. The method may involve generating at least one of an encoded block and a sparse block in response to the plurality of said second data fragments.

Generating at least one of an encoded block and a sparse block in response to the first data fragment may involve generating said at least one of an encoded block and a sparse block by at least a portion of an encoder being executed on one of the first server, the second server, the third server, and a fourth server of the plurality of servers. Generating at least one of an encoded block and a sparse block in response to the plurality of said first data fragments may involve generating said at least one of an encoded block and a sparse block by at least a portion of an encoder being executed on one of the first server, the second server, the third server, and a fourth server of the plurality of servers. Generating at least one of an encoded block and a sparse block in response to the second data fragment may involve generating said at least one of an encoded block and a sparse block by at least a portion of an encoder being executed on one of the first server, the second server, the third server, and a fourth server of the plurality of servers. Generating at least one of an encoded block and a sparse block in response to the plurality of said second data fragments may involve generating said at least one of an encoded block and a sparse block by at least a portion of an encoder being executed on one of the first server, the second server, the third server, and a fourth server of the plurality of servers.

Generating at least one of an encoded block and a sparse block in response to the plurality of said first data fragments may involve generating a block buffer comprising the plurality of said first data fragments. Generating at least one of an encoded block and a sparse block in response to the plurality of said second data fragments may involve generating a block buffer comprising the plurality of said second data fragments.

Generating the block buffer comprising the plurality of said first data fragments may involve generating a frame buffer comprising a frame of the plurality of said first data fragments. Generating a block buffer comprising the plurality of said second data fragments may involve generating a frame buffer comprising a frame of the plurality of said second data fragments.

The method may involve transmitting said at least one of an encoded block and a sparse block to a client computer via a network of connected computers.

In accordance with another aspect of the invention, there is provided a system for distributed computing operations. The system includes a plurality of networked computing servers operable to execute a computing application across a plurality of said servers. The system is operable to (a) transfer a first digitized object of a digitized data associated with the computing application from a first server of the plurality of servers to a second server of the plurality of servers when the second server is executing a first rendering pipeline; and operable to (b) transfer a second digitized object of the digitized data associated with the computing application from the first server to a third server of the plurality of servers when the third server is executing a second rendering pipeline.

The system may be operable to generate a first data fragment by the first rendering pipeline. The system may be operable to generate a second data fragment by the second rendering pipeline. The system may be operable to generate a plurality of said first data fragments. The system may be operable to generate a plurality of said second data fragments.

The system may be operable to generate at least one of an encoded block and a sparse block in response to the first data fragment. The system may be operable to generate at least one of an encoded block and a sparse block in response to the plurality of said first data fragments. The system may be operable to generate at least one of an encoded block and a sparse block in response to the second data fragment. The system may be operable to generate at least one of an encoded block and a sparse block in response to the plurality of said second data fragments.

The system may be operable to generate said at least one of an encoded block and a sparse block by at least a portion of an encoder being executed on any one server of the plurality of servers.

The system may be operable to generate a block buffer comprising the plurality of said first data fragments. The system may be operable to generate a block buffer comprising the plurality of said second data fragments.

The system may be operable to generate a frame buffer comprising a frame of the plurality of said first data fragments. The system may be operable to generate a frame buffer comprising a frame of the plurality of said second data fragments.

The system may be operable to transmit said at least one of an encoded block and a sparse block to a client computer via a network of connected computers.

In accordance with another aspect of the invention, there is provided a system for distributed computing operations. The system includes: (a) means for transferring a first digitized object of the digitized data associated with a computing application being executed across a plurality of servers from a first server of the plurality of servers to a second server of the plurality of servers when the second server is executing a first rendering pipeline; and (b) means for transferring a second digitized object of the digitized data associated with the computing application from the first server to a third server of the plurality of servers when the third server is executing a second rendering pipeline.

Embodiments can include combinations of the above features.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

DETAILED DESCRIPTION

Figure 1:
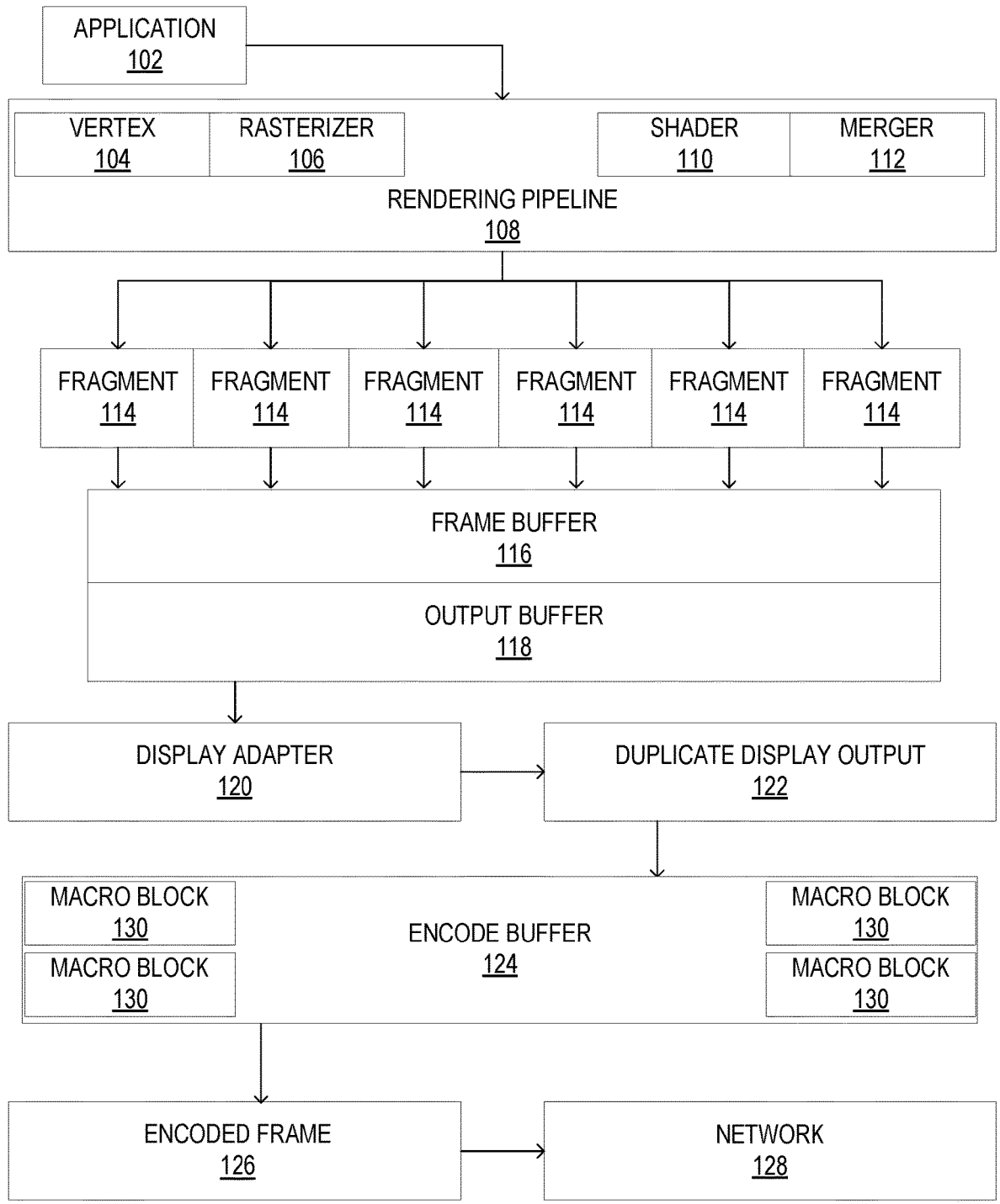
FIG. 1 is a flow diagram of a prior art method of streaming image data.

FIG. 1 is a flow diagram of a prior art method of streaming image data;

Referring to FIG. 1, a prior art system and method for streaming image data originating in a computing application (e.g. computer game, virtual reality application, word processor) to a remote client via a network is shown. It is known in the prior art that a single CPU (Central Processing Unit) of a server executes via or under management of its operating system a rendering pipeline, a frame buffer, an output buffer, and a display adapter function. Additionally, for streaming the image data to the remote client, the single CPU of the server executes a re-capturing of the display output, buffering, encoding, and transmitting via the network to the remote client.

For example, the size of the frame buffer may differ based on 4 k or 8 k resolution of the display. For example, the average time to generate a frame may be 3 s in HD, 6 ms in 4 k and 12 ms in 8 k. For example, the average time to copy by the display adapter 120 may be 1 ms in HD, 3 ms in 4 k, or 6 ms in 8 k. For example, the average time to copy by the duplicate display output 122 may be 1 ms in HD, 3 ms in 4 k, or 6 ms in 8 k. For example, the average time to encode and copy the encoded frame 126 may be 5 ms in HD, 10 ms in 4 k, and 20 ms in 8 k. For example, the average to send over the network may be 2 ms in HD, 4 ms in 4 k, and 8 ms in 8 k.

Figure 2:
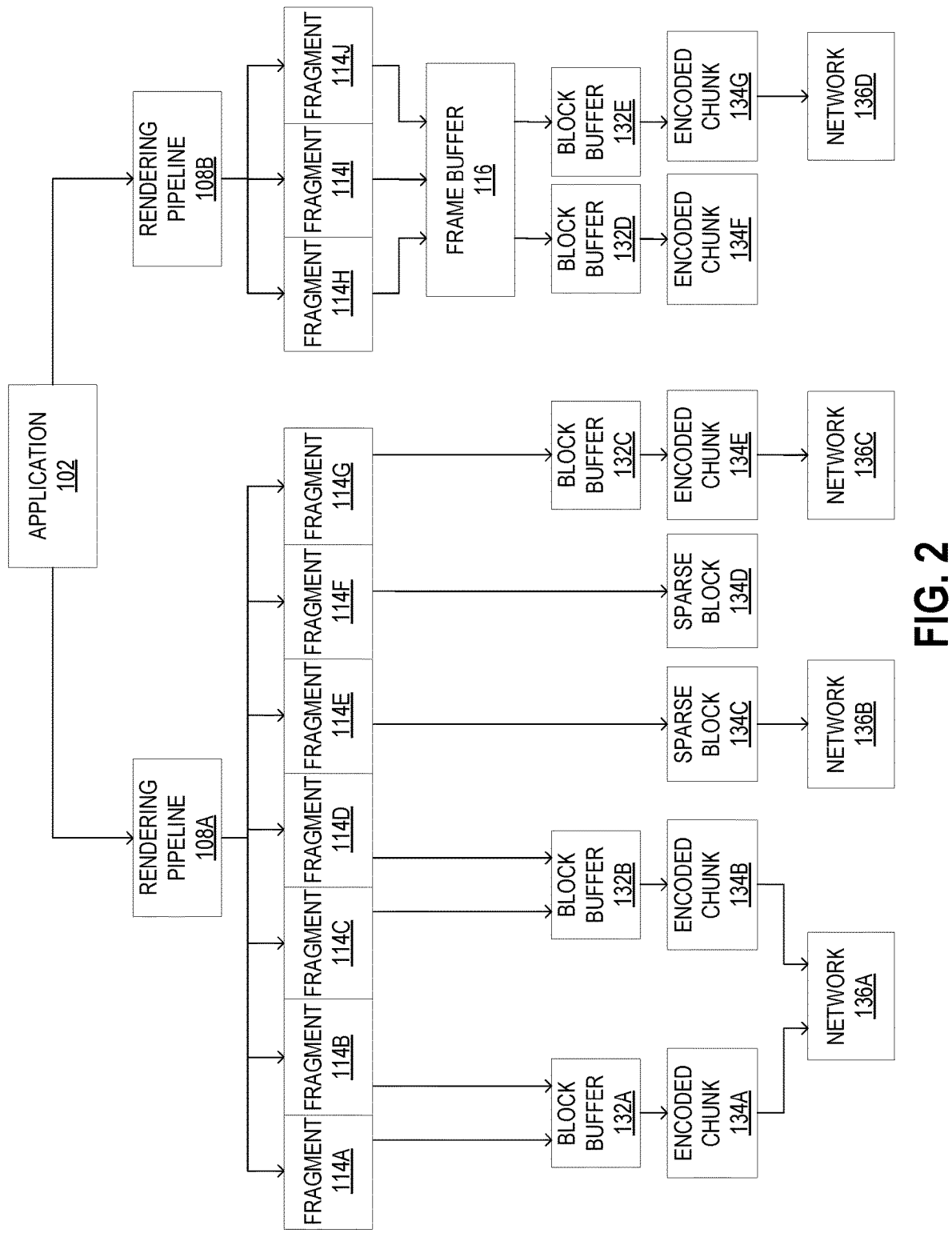
FIG. 2 is a flow diagram of a distributed method of rendering and encoding image data for streaming to a remote client according to embodiments of the invention, showing non-frame blocks of image data rendered and encoded.

FIG. 2 is a flow diagram of a distributed method of rendering and encoding image data for streaming to a remote client according to embodiments of the invention, showing non-frame blocks of image data rendered and encoded.

Advantageously, time for rendering a frame may be reduced.

Referring to FIG. 2, a novel system and method for streaming image data is shown. This novel streaming system and method is in the context of a distributed operating system being executed on a distributed architecture of a plurality of server computers (or servers) for distributed computing operations. The servers are in communication with each other via a network, e.g. as a LAN, WAN, or the Internet.

In some embodiments, one or more operating systems may be distributed across the network of servers, such as in the form of partial or complete virtual machines. A kernel of a given operating system may be installed in a number of network-connected servers forming a cluster, and other portions of the given operating system is installed on various servers of the cluster. Different servers within the cluster may have installed therein different portions of the given operating system. A plurality of the servers within the cluster may have installed therein a same portion of the given operating system. Different portions of the given operation system can be executed on different servers within the cluster at the same or different times. The portion of the given operating system that is executed on a given server at any time is selected by an administrative function of the cluster in response to the processing requirements and capabilities of the given server at that time. The portions of the given operating system that is executed on the given server can be altered dynamically and in real-time to adjust to changing operating requirements of the cluster. Multiple, different operating systems may be executed simultaneously or at different times at various servers of the cluster in a distributed manner.

FIG. 2 shows a computing application (e.g. computer game, virtual reality application, word processor, or an application requiring 3D graphics rendering) being executed. In some embodiments of FIG. 2, the computing application originates image data for streaming to a remote client computer. In the exemplary embodiment of FIG. 2, the computing application is distributed across the servers of the cluster, such that different servers within the cluster may have installed therein different portions of the given computing application.

FIG. 2 shows at least one portion of the computing application being executed on a first server. The first server is in networked communication with any number of other servers in the cluster, and FIG. 2 shows the first server in communication with a second server in which a first rendering pipeline is being executed and also in communication with a third server in which a second rendering pipeline is being executed. The at least one portion of the computing application transfers a first portion of the image data to the first rendering pipeline and a second portion of the image data to the second rendering pipeline. For example, a display screen having a known resolution may be split into two parts (e.g. top and bottom, or left and right sides) and the first portion of the image data corresponds to the first part of the display screen while the second portion of the image data corresponds to the second part of the display screen. In general, any number of display screen parts may be employed and any number of rendering pipelines may be employed on any number of servers.

In the exemplary embodiment of FIG. 2, the rendering pipeline generates a plurality of fragments of an image frame. Each fragments corresponds to some portion of the image data at some time in the stream of image data. For example, a fragment may correspond to image data associated with particular pixels of the display screen.

In some variations, a number of image fragments are combined into a image frame according to known standards of frame size. However, forming a frame is not necessarily in all cases and the two different rendering pipelines of FIG. 2 show two different possible treatments of image frames. In some embodiments, a given rendering pipeline might be customizable to avoid the step of generating an image frame, which a different rendering pipeline on a given server might not be customizable and thus will produce the standard image frame.

In any event, a plurality of fragments are collected into a buffered block of image data (block buffer) stored on any one or more of the servers. The server on which a given rendering pipeline resides does not necessarily need be the same as the server on which the block buffer is formed. Each image block contains pixel data and header or meta data (e.g. screen location, image coordinates, colour, or layer order for layered image data) associated with any number of pixels associated with the display of the image data.

From the image fragments are formed encoded blocks (or chunks) and/or sparse blocks. An encoded block is generated from a buffered block by an encoding function of the distributed operating system. Thus, it is not necessary for the encoding to occur on the same server as the buffering and/or rendering. A sparse block is a block that, instead of directly providing pixel data, references another block of image data so as to provide instructions related to the differences between the sparse block and its reference block. In some cases, a sparse block is merely an instruction to duplicate the pixel data (e.g. colour) of an identified reference block. In this manner, the generation of a sparse block from an image fragment can bypass the buffered block, as shown in FIG. 2 by dotted and solid lines.

In some embodiments, the use of different servers for the rendering and the encoding advantageously allows a second server to begin encoding as soon as rendering generates a first fragment, thereby advantageously avoiding prior art contention by a prior art single CPU executing both rendering and encoding. Any number of servers may employed for rendering, and any number of servers may be employed for encoding. The servers employed for rendering may be the same or different from those employed for encoding. Rendering may occur in parallel on multiple servers. Encoding may occur in parallel on multiple servers. The number of servers employed for rendering and/or encoding and other related functions can be adjusted dynamically in response to network contingencies, number of dots per pixel, client device performance capabilities, and available resources (e.g. number of encoders available), streaming rate in frames-per-second, other system factors, and any combination thereof for example.

In some embodiments, the sparse and encoded blocks are transmitted to a client over the network, as shown in FIG. 2.

In some embodiments, the system is operable to send the same encoded blocks to a plurality of clients for display of the same or similar image data on their respective servers.

In some embodiments, when using sparse data, the system is operable to dynamically adjust when reference image data is transmitted to a client, such that reference image data is transmitted only when required by the client.

In some embodiments, when a given client is unable to process received image data as quickly as it is nominally being streamed to the client, the server(s) involved purge image blocks and/or frames.

In some embodiments, when data is being transferred from one server to another for (parallel) processing within the cluster, a shared memory is defined and pointers to memory locations within the shared memory of the defined server is transferred to the other server to permit access. To avoid collisions when one server wishes to read while another server wishes to overwrite a given memory location, priority is assigned. In some embodiments, priority is given to overwriting memory such that reading memory is delayed until the overwriting operation is completed. Memory management techniques are employed to minimize the number of collisions, such that the shared memory is treated as a memory loop in which the overwriting operation proceeds through the shared memory until reaching the defined end of the memory address range and then moves to the beginning of the memory address range. In such memory loop, the overwriting and reading operations are managed such that the overwriting stays "ahead" of the reading operations by a suitable margin to minimize the likelihood of a read/write collision, thereby minimizing the number of times that the reading operation must be delayed to ensure completion of an overwriting operation. The size of memory loop can be adjusted according to system resources, for example.

In some embodiments, the system in exemplary embodiments is operable to implement network security features at the computing application level, rather than the prior art server level. By executing different portions of a given computing application at different servers, network security is advantageously enhanced due to increased isolation between different parts of a given computing application.

FIG. 2 shows the computing application in the context of a distributed operating system, in which a kernel of a given operating system is installed and being executed on each server of the cluster. Different remaining portions of the given operating system is installed and executed on various server(s) within the cluster, in response to resource availability, performance requirements, other system factors, and any combination thereof for example. The different remaining portions of the given operating system are installed and executed on an as-needed basis. Different portions or libraries or complete libraries associated with the given operating system are installed and executed on an as-needed basis. Similarly, different portions of the computing applications are installed and executed on various server(s) on an as-needed basis.

In some embodiments, the system is advantageously operable to restrict execution associated with the given computing application or portion thereof, library or portion thereof, and non-kernel portion of the operating system, on the given server to an as-needed basis, thereby advantageously executing the given computing application in a manner that is distributed across any number of server(s).

Figure 3:
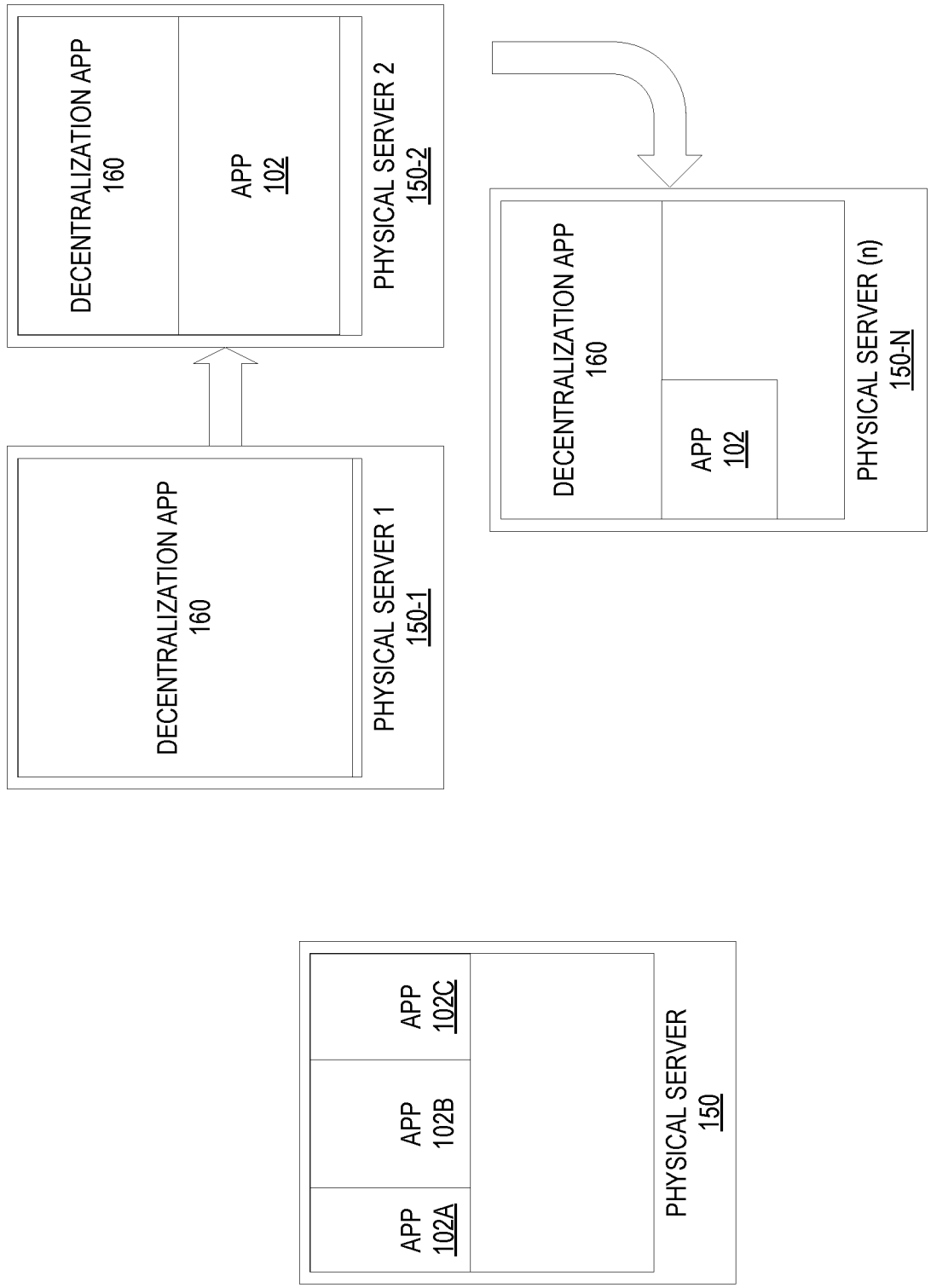
FIG. 3A is a block diagram of a prior art execution of multiple computing applications on one physical server.
FIG. 3B is a block diagram of a distributed execution of multiple computing applications, according to embodiments of the invention.

FIG. 3A is a block diagram of a prior art execution of multiple computing applications on one physical server.

The virtual machine client/server technology illustrated in FIG. 3A may be limited by resources of the virtual machine/server, e.g. the virtual machine may define 72 VCPUs, 1.4 TB RAM, and 2 GPUs. The applications on the virtual machine may be then limited to 7 VCPUs.

FIG. 3B is a block diagram of a distributed execution of multiple computing applications according to embodiments of the invention.

In principle, distribution may provide more performance since computer power is not limited to a single resource. For example, no preallocation of resources (memory and/or other resources) may be required. The decentralization app 160 may be implemented as a containerized application. The decentralization app 160 may contain within it, and operate within it, other applications, e.g. a video game application, a streaming video application, a VR application, or 3D rendering application. Advantageously, scalability may be achieved since the decentralization app 160 may then distribute the graphics rendering workload association within these other applications to other servers.

The decentralization app 160 may be technology includes architecture which runs just enough of a desired application and libraries required to view and interact with the application on a server (e.g. a handheld device) by a user.

For example, I386, AMD64, x86 or x64 applications may be then ported with no changes. For example, API support may be natively provided, e.g. CUDA, EGL, MESA, OpenCL, OpenGL, EGL, Vulkan and other APIs supported by Intel™, Nvidia™ or AMD™. For example, multi-process applications may dynamically scale in and across machine boundaries in the cluster while single-process applications may be limited to the resources of the host/virtual machine limitation.

Figure 4:
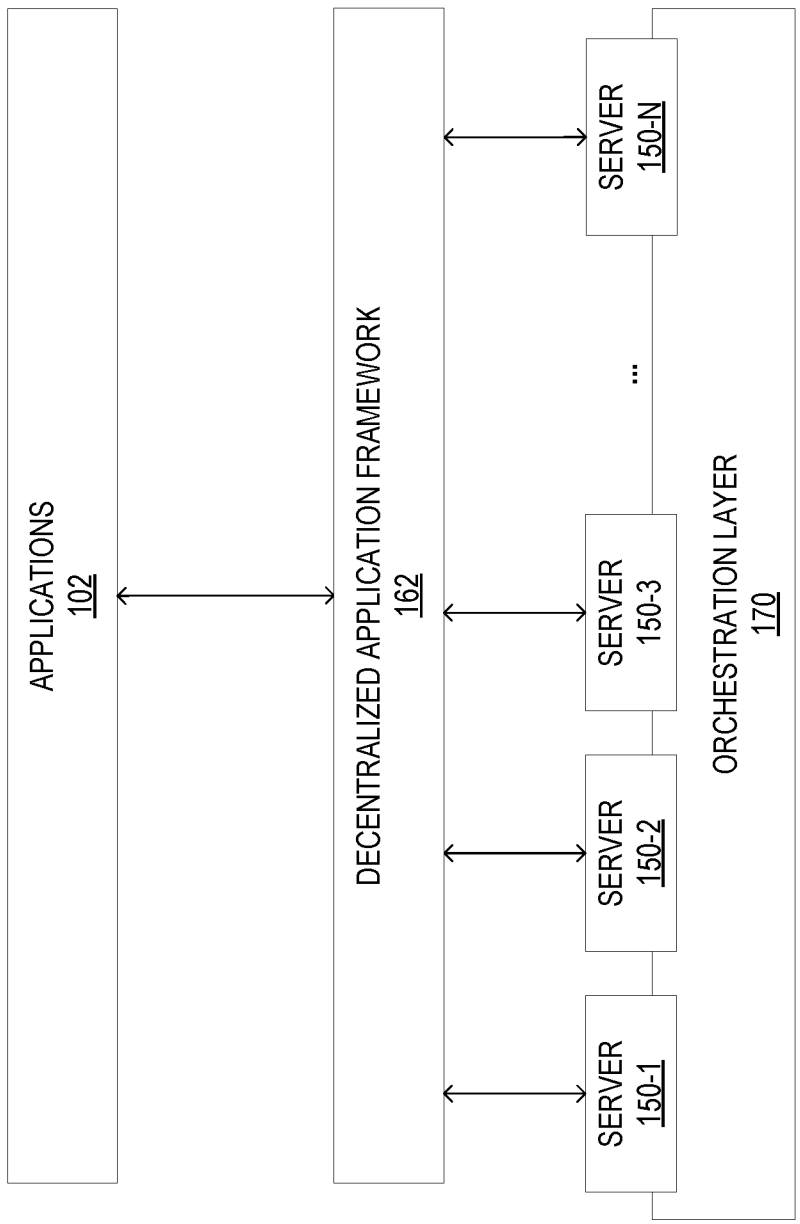
FIG. 4 is a block diagram of a cluster of servers allowing distributed execution of applications, according to embodiments of the invention.

FIG. 4 is a block diagram of a cluster of servers according to embodiments of the invention, showing different components of a computing application being executed on different servers, and showing different components of an operating system being executed on different servers.

For example, applications 102 may encompass controllers (pen, Joystick, VR, headset), audio, shared session, mic, app store, camera, split screen, snipping tool, dock, app buckets, share drive.

For example, decentralized application framework 162 may include app manager, network, notifications, graphics, sessions manager, device, resources manager, media, package manager, VR, interactive display, and syncer.

In various embodiments, the interactive display protocol may include pixel and interactive streaming directly to display buffer, congestion control, jitter packet loss, packet inspection, FPS adjustment, autosizing and autoscaling, Compression H265, H264, AV1, codec agnostic, autoencryption. The interactive display protocol may be compatible with VR/PC/Mobile Supports mic, webcam, audio accessible through browser (clientless).

Figure 5:
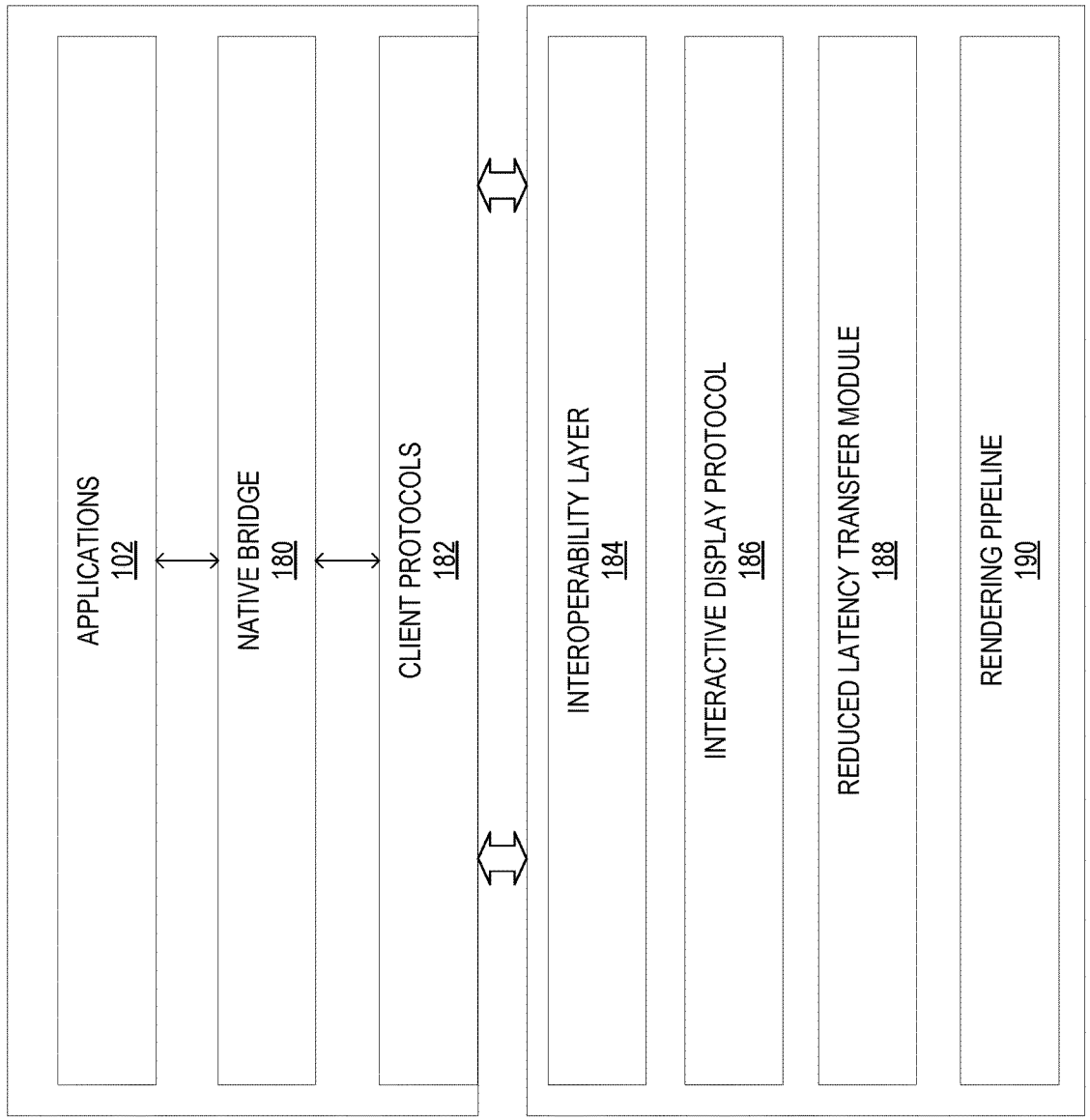
FIG. 5 is a block diagram of different components associated with different layers according to embodiments of the invention, showing communication between server(s) and client(s)

FIG. 5 is a block diagram of different components associated with different layers according to embodiments of the invention, showing communication between server(s) and client(s).

The client protocols may include SRTP, SCTP, UDP, STUN, Relay, NAT, or Socket.

The interactive display protocol may include realtime congestion control, jitter packet lost connection, dynamic fps, detection adaptive bitrate, auto sizing and autoscaling, codec, agnostic, compression, metrics, monitoring.

The rendering pipeline 190 may serve graphics, devices, media, VR, syncer, or plugins.

The decentralization app technology may include Interactive Web Services. For example, web browser or mobile UX services may be provided. APIs may be provided for display and peripherals, app launching controls, dynamic resource scaling, user access and control, publishing content and apps. For example, core services may include app isolation, app launch and monitoring, shared resources managements, billing, app management, and distributed file system.

In various embodiments, advantages with respect to security may be achieved.

In various embodiments, the decentralization app technology provides apps fingerprint (app images cannot be modified without admin permission), network security policies per App (Only ports and IPs whitelisted are allowed), assets storage (No assets can be transferred outside the "Cloud" without admin permission), app isolation (no viruses between Apps because they do not run in the same OS), and zerotrust technology.

In various embodiments, advantages are obtained with respect to end-user devices. For example, no data is stored in User/Artists PC, only pixel streaming and inputs are allowed in local PC, encryption keys for inputs/streaming are created/deleted every time an app is open or closed.

Figure 6:
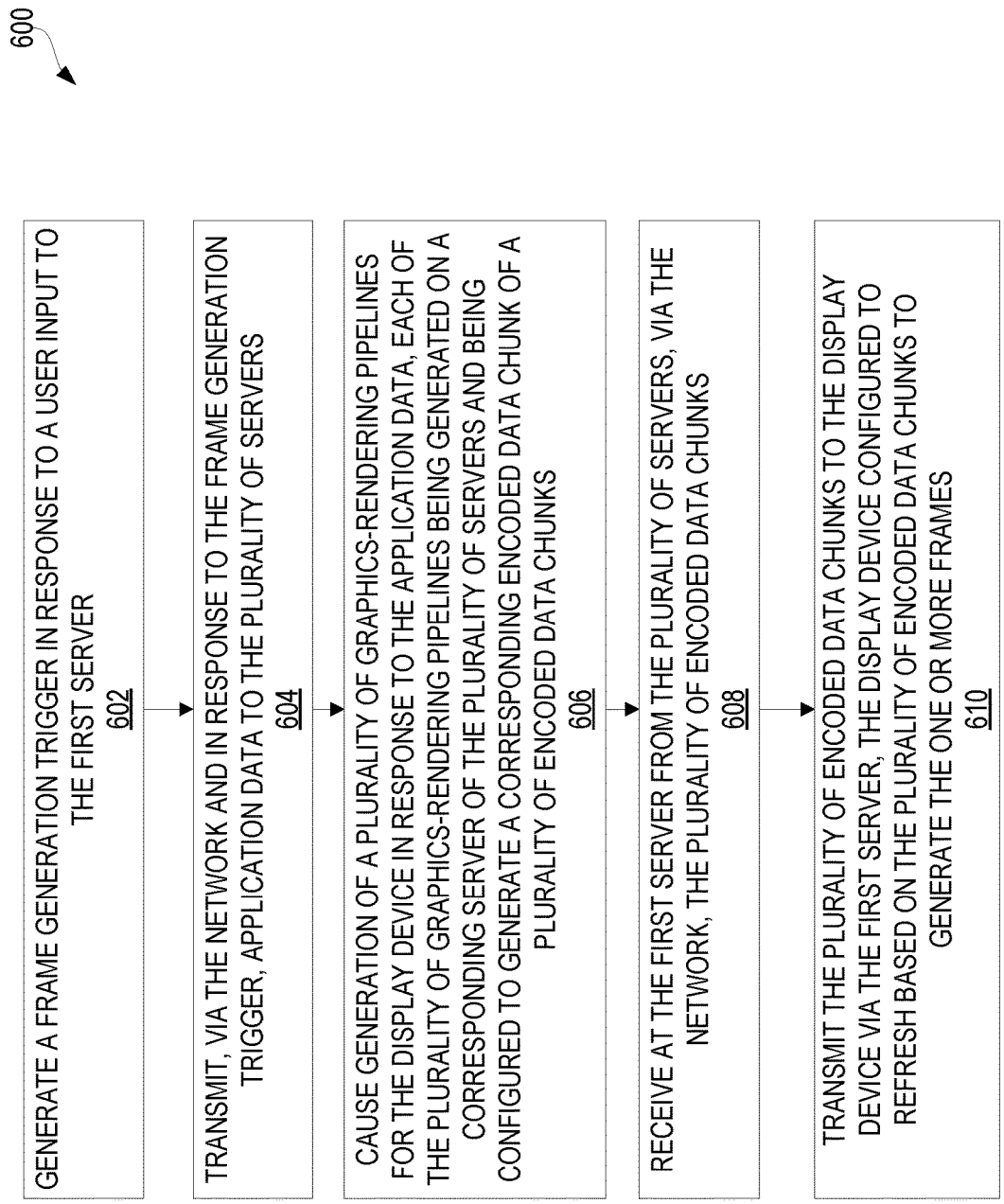
FIG. 6 is an exemplary flow chart of a computer-implemented method of generating one or more frames.

FIG. 6 is an exemplary flow chart of a computer-implemented method 600 of generating one or more frames. The one or more frames are generated via a plurality of servers connected to each other by a network, for a display device operably connected to a first server of the plurality of servers.

Step 602 includes generating a frame generation trigger in response to a user input to the first server.

In various embodiments, frame generation triggers may be data or a signal indicative of events or actions that prompt the need for updating and generating a new frame in a graphics or rendering system. In various embodiments, frame generation triggers may be caused by user interaction events, such as mouse click or button press, mouse movement, or touch interactions, e.g. clicking a button, pressing a key, or interacting with a user interface element can trigger the need for a new frame, continuous mouse movement may trigger frame updates, especially in applications where the camera or viewpoint follows the mouse, touch gestures on touchscreens, such as swiping or tapping, can trigger frame updates in mobile applications or interactive displays. For example, opening a menu, clicking on a character in a game, or selecting an option in an application. In various embodiments, frame generation triggers may be caused by timer or animation events, e.g. frames may be generated at regular intervals for animations or updates. A timer event may trigger frame generation for smooth motion or transitions. In various embodiments, frame generation triggers may be caused by window Resizing: resizing an application window or changing the screen resolution may trigger the generation of new frames to adapt to the new display dimensions. In various embodiments, frame generation triggers may be caused by scrolling: scrolling through content, whether in a document or a web page, can trigger frame updates to reflect the new visible area. In various embodiments, frame generation triggers may be caused by external events such as network data arrival. For example, in online applications or games, the arrival of new data from a network (e.g., multiplayer interactions) may trigger frame updates to reflect the latest information. In various embodiments, frame generation triggers may be caused by sensor Input (e.g., Gyroscope), e.g. in applications or games that utilize sensors, changes in sensor input (e.g., device rotation) can trigger frame updates for dynamic rendering. In various embodiments, frame generation triggers may be caused by application-specific events. For example, loading a new level or scene in video games. Transitioning between levels or scenes may trigger the generation of new frames to display the updated environment. In various embodiments, frame generation triggers may be caused by content changes: Adding, removing, or modifying objects in the scene can trigger frame updates to reflect the changes. In various embodiments, frame generation triggers may be caused by user-defined events: custom events defined by the application or game logic, such as reaching a specific checkpoint or completing a task, can trigger frame updates.

Step 604 of the method 600 includes transmitting, via the network and in response to the frame generation trigger, application data to the plurality of servers.

In various embodiments, application data may be associated with a 3D scene. For example, application data may encompass information regarding 3D models, camera viewpoints, lighting conditions, and various scene characteristics.

Step 606 of the method 600 includes causing generation of a plurality of graphics-rendering pipelines for the display device in response to the application data, each of the plurality of graphics-rendering pipelines being generated on a corresponding server of the plurality of servers and being configured to generate a corresponding encoded data chunk of a plurality of encoded data chunks.

In various embodiments, the graphics-rendering pipeline may comprise multiple stages. For example, each stage may provide a level of flexibility that may be adapted to distinct implementation requirements. The following delineates example stages of the graphics rendering pipeline, recognizing that their inclusion or exclusion may hinge on specific design considerations.

In various embodiments, the vertex processing, or vertex shader, stage of the graphics-rendering pipeline may be based on the application data. In various embodiments, this stage may undertake the transformative task of converting individual vertices of 3D models from object space to camera space. Such transformations may encompass operations such as scaling, rotation, and translation, contributing to the nuanced spatial arrangement of the graphical elements. In various embodiments, a subsequent stage, labeled geometry processing, may be a juncture where primitives, such as triangles, may be assembled from the transformed vertices. In various embodiments, this stage may also accommodate additional computations, such as the generation of normal vectors, adding complexity and detail to the graphical representation. A further stage, the clipping and culling stage, may allow for optional operations in various embodiments. Continuing along the pipeline, in various embodiments, the rasterization stage may convert geometric primitives into pixels on a display screen. In various embodiments, this stage determines pixel coverage and may assign attributes like color and depth to each pixel, contributing to the formation of the final image. Subsequent stages, including fragment processing (fragment shader) and depth testing, may further refine the visual output. The pixel output, or frame buffer, stage may capture the final processed pixels in memory, readying them for potential post-processing effects. In various embodiments, optional post-processing stages may include applying visual enhancements such as bloom, motion blur, or anti-aliasing to elevate the overall visual quality of the rendered image.

The concluding output to display stage may involve generation of the plurality of encoded data chunks representing the contents of the frame buffer for transmission to a display device via a display protocol.

Generation of the plurality of encoded data chunks may involve converting graphical information into a compressed or encoded format suitable for transmission over a communication channel, often adhering to a specific display protocol. Compression techniques may be applied to reduce the size of the data, making it more manageable for transmission and storage. Common compression methods include lossless and lossy compression algorithms.

In some embodiments, a display protocol may be specified at each of the plurality of servers. In some cases, different display protocols and applications may utilize various encoding and compression techniques based on their specific requirements and constraints.

When generating encoded data chunks (e.g. for a given display protocol), certain information about the display device is crucial to ensure proper rendering. In some embodiments, a negotiation may be carried out to determine the requirements of the display device, e.g. such that the encoded data chunk are compatible with the display device. The specifics may vary based on the display protocol and the characteristics of the target display. For example, the encoded data may need to be tailored to match the native resolution and aspect ratio of the display to ensure accurate representation without distortion. For example, encoded data may need to be formatted to match the color characteristics of the display, including considerations for color gamut, bit depth, and any specific color profiles. In some cases, display devices may support specific features such as High Dynamic Range (HDR), wide color gamut, or variable refresh rates. This information may be relevant for encoding data that takes advantage of these features and enhances the overall visual quality. In various embodiments, the type of connection between the graphics source and the display device, as dictated by the display protocol (HDMI, DisplayPort, or another protocol), may be important as the encoded data may be required to adhere to the requirements of the chosen connection. In various embodiments, information regarding the decoding capabilities of the display device may be important as different devices may have varying levels of support for decoding algorithms, compression formats, and display resolutions. In various embodiments, information about the display device's latency characteristics may be important for the encoding process to reduce delays as certain applications, especially those involving real-time interactions or gaming, may have stringent latency requirements.

Step 608 of the method 600 includes receiving at the first server from the plurality of servers, via the network, the plurality of encoded data chunks.

Step 610 of the method 600 includes transmitting the plurality of encoded data chunks to the display device via the first server, the display device configured to refresh based on the plurality of encoded data chunks to generate the one or more frames.

The encoded data chunks may be transmitted over a communication channel, such as a cable, network connection, or wireless link, based on the chosen display protocol. This transmission may occur in real-time or in a streaming fashion.

The display device may suitable configured to decode the compressed data and reconstruct the original graphical information in the plurality of encoded data chunks. The decoded graphical data may then be rendered on the display device by refreshing thereof to reconstruct the images or frames in a format suitable for the screen.

Advantageously, spawning of a plurality of rendering pipelines distributed across a plurality of servers may allow faster generation of frames and thus facilitate more responsive applications. For example, a user-facing server (e.g. a computing device such as a tablet computer) may not require generation of at least some encoded data chunks, as these may be generated by other servers. It is understood that, in some embodiments, each server of the plurality of servers may distribute their own processing workload.

In some embodiments of the method 600, the application data includes 3D model data for generating a scene.

Some embodiments of the method 600 include generating the frame generation trigger by a containerized application associated with an operating system of the first server.

Such a containerized application may also be referred to as an application container. In various embodiments, a containerized application may be a lightweight, portable, and standalone executable software package that includes everything needed to run a piece of software, including the code, runtime, system tools, libraries, and settings. Advantageously, containerized applications may provide a consistent and isolated environment for applications, allowing them to run consistently across different computing environments, from development to testing to deployment. Containerized applications may encapsulate an application and its dependencies, ensuring that it runs in an isolated environment without interfering with other applications or the underlying system. This isolation may be achieved through containerization technologies like Docker™. Advantageously, containers may be suitable to run consistently across various environments, such as development machines, testing servers, and production servers.

Containerized applications may share the host operating system's kernel, making them more lightweight than traditional virtual machines. This leads to faster startup times and efficient resource utilization.

The decentralization application technology may be implemented via a containerized application. For example, each server of the plurality of servers may share its host operating system with a containerized application.

Figure 7:
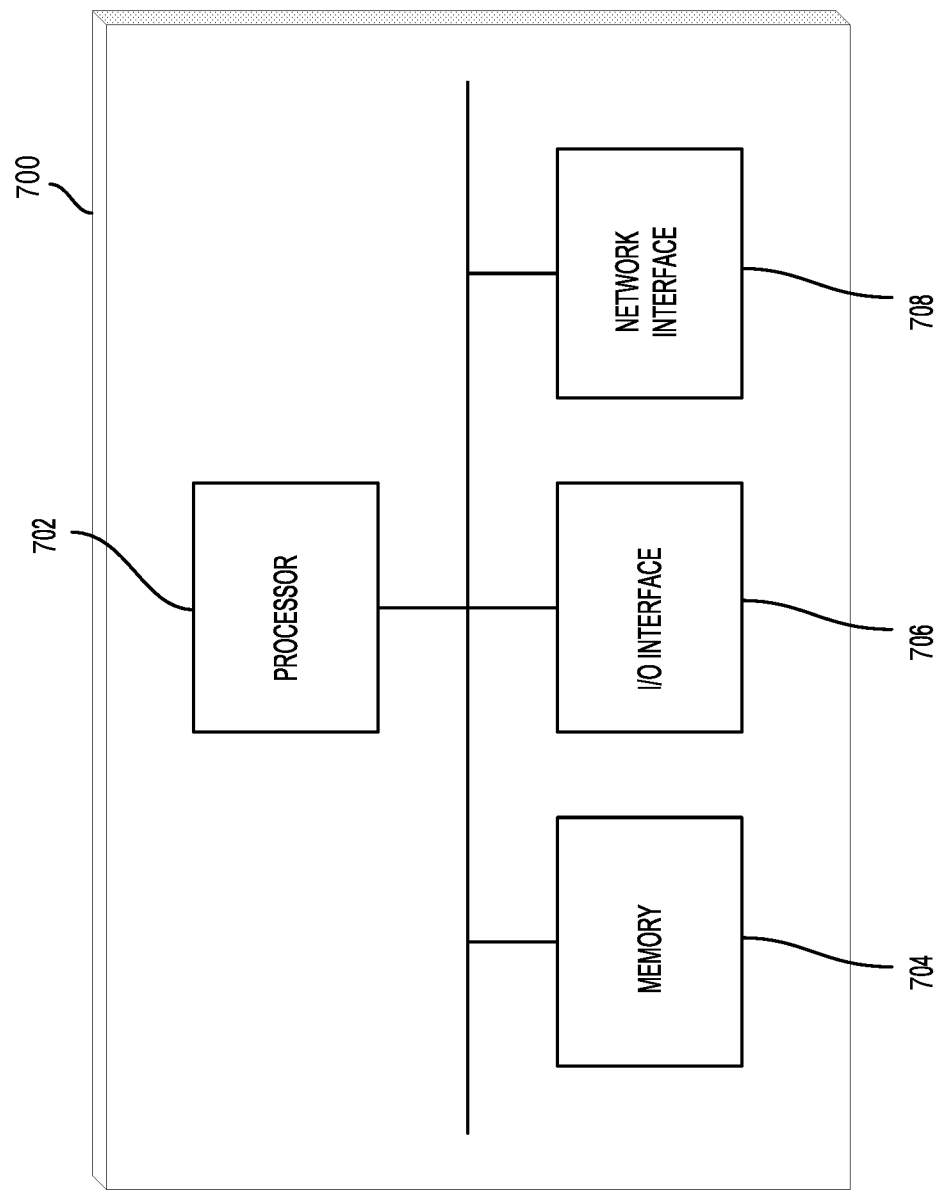
FIG. 7 illustrates a block diagram of a computing device, in accordance with an embodiment of the present application.

FIG. 7 illustrates a block diagram of a computing device 700, in accordance with an embodiment of the present application.

As an example, a system, a computing device, a server, or a client device may be implemented using the example computing device 700 of FIG. 7. Such device(s) may implement the method 600.

The computing device 700 includes at least one processor 702, memory 704, at least one I/O interface 706, and at least one network communication interface 708.

The processor 702 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 704 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 706 may enable the computing device 700 to interconnect with one or more input devices, such as a keyboard, mouse, camera, touch screen and a microphone, or with one or more output devices such as a display screen and a speaker.

The networking interface 708 may be configured to receive and transmit data sets representative of the machine learning models, for example, to a target data storage or data structures. The target data storage or data structure may in some embodiments, reside on a computing device or system such as a mobile device.

Figure 8:
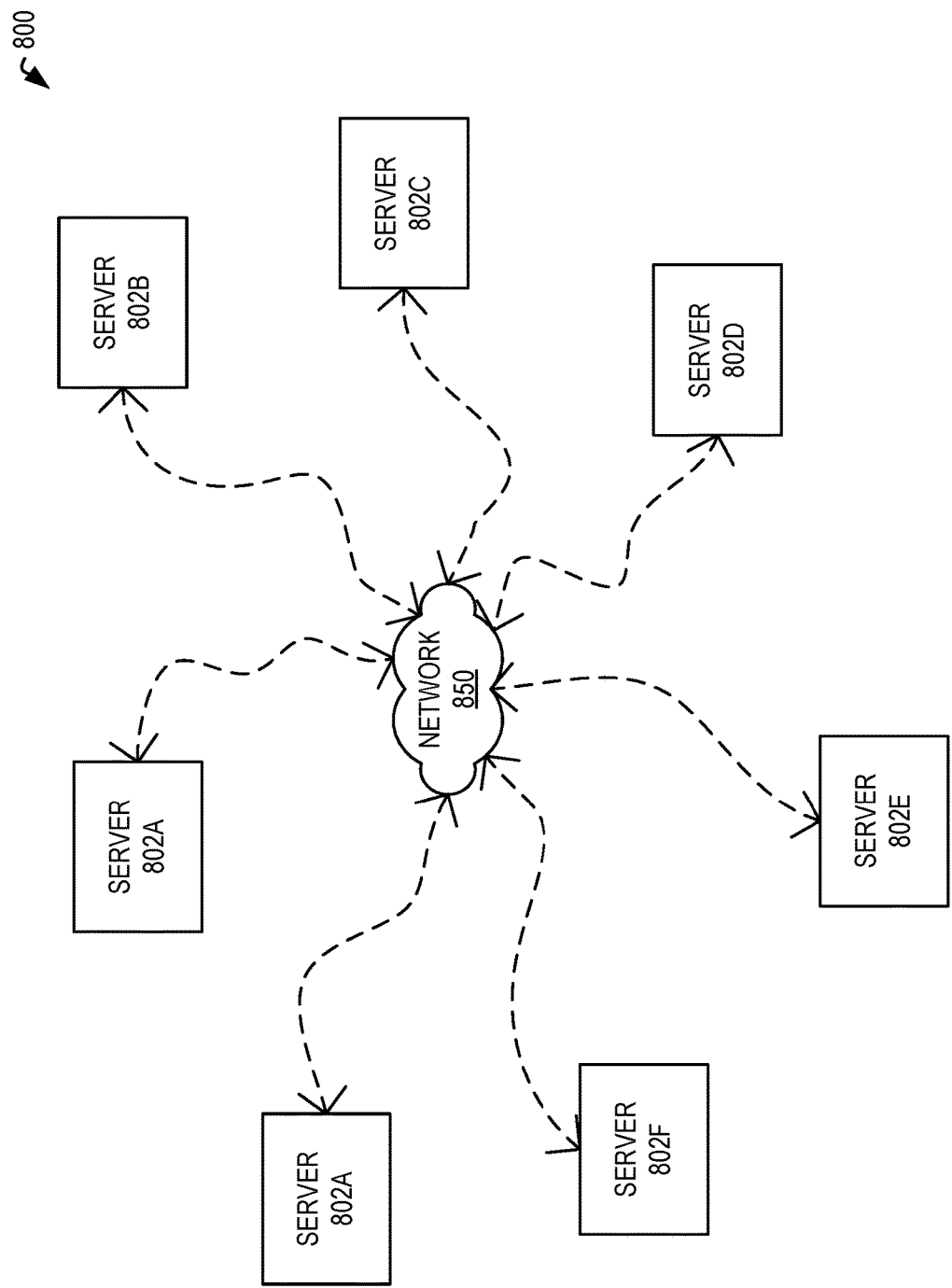
FIG. 8 is a schematic of a plurality of network-connected servers, in accordance with an embodiment.

FIG. 8 is a schematic of a plurality of network-connected servers 800, in accordance with an embodiment. For example, the plurality of network-connect servers 800 may be referred to as a cluster of servers.

The servers 802A, 802B, 802C, 802D, 802E, 802F are connected to each other via the network 850. For example, each of these servers may a computing device as shown in FIG. 7.

As can be understood, the examples described above and illustrated are intended to be exemplary only.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and/or steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

What is claimed is:

1. A computer-implemented method of generating one or more frames, via a plurality of servers connected to each other by a network, for a display device operably connected to a first server of the plurality of servers, comprising:
    (a) generating a frame generation trigger in response to a user input to the first server;
    (b) transmitting, via the network and in response to the frame generation trigger, application data to the plurality of servers;
    (c) causing generation of a plurality of graphics-rendering pipelines for the display device in response to the application data, each of the plurality of graphics-rendering pipelines being generated on a corresponding server of the plurality of servers and being configured to generate a corresponding encoded data chunk of a plurality of encoded data chunks;
    (d) receiving at the first server from the plurality of servers, via the network, the plurality of encoded data chunks; and
    (e) transmitting the plurality of encoded data chunks to the display device via the first server, the display device configured to refresh based on the plurality of encoded data chunks to generate the one or more frames.

2. The method of claim 1, wherein the application data includes 3D model data for generating a scene.

3. The method of claim 1, wherein step (a) includes generating the frame generation trigger by a containerized application associated with an operating system of the first server.

4. A non-transitory computer-readable medium having stored thereon machine interpretable instructions which, when executed by one or more processors, cause the one or more processors to perform a computer-implemented method of generating one or more frames, via a plurality of servers connected to each other by a network, for a display device operably connected to a first server of the plurality of servers, the method comprising:
    (a) generating a frame generation trigger in response to a user input to the first server;
    (b) transmitting, via the network and in response to the frame generation trigger, application data to the plurality of servers;
    (c) causing generation of a plurality of graphics-rendering pipelines for the display device in response to the application data, each of the plurality of graphics-rendering pipelines being generated on a corresponding separate server of the plurality of servers and configured to generate a corresponding separate encoded data chunk of a plurality of encoded data chunks;
    (d) receiving at the first server from the plurality of servers, via the network, the plurality of encoded data chunks; and
    (e) transmitting the plurality of encoded data chunks to the display device via the first server, the display device configured to refresh based on the plurality of encoded data chunks to generate the one or more frames.

5. The non-transitory computer-readable medium of claim 4, wherein the application data includes 3D model data for generating a scene.

6. The non-transitory computer-readable medium of claim 4, wherein step (a) includes generating the frame generation trigger by a containerized application associated with an operating system of the first server.

7. A system, comprising:
    a display device; and
    a first server of a plurality of servers connected to each other by a network, the first server being operably connected to the display device and being configured to generate one or more frames via the plurality of servers for the display device, the first server including
        one or more processors, and
        computer-readable memory coupled to the one or more processors and storing processor-executable instructions that, when executed, configure the one or more processors to:
        (a) generate a frame generation trigger in response to a user input to the first server;
        (b) transmit, via the network and in response to the frame generation trigger, application data to the plurality of servers;
        (c) cause generation of a plurality of graphics-rendering pipelines for the display device in response to the application data, each of the plurality of graphics-rendering pipelines being generated on a corresponding separate server of the plurality of servers and configured to generate a corresponding separate encoded data chunk of a plurality of encoded data chunks;

(d) receive at the first server from the plurality of servers, via the network, the plurality of encoded data chunks; and (e) transmit the plurality of encoded data chunks to the display device, via the first server, the display device configured to refresh based on the plurality of encoded data chunks to generate the one or more frames.

8. The system of claim 7, wherein the application data includes 3D model data for generating a scene.

9. The system of claim 7, wherein step (a) includes generating the frame generation trigger by a containerized application associated with an operating system of the first server.

* * * * *